United States Patent [19]

Howell et al.

[11] Patent Number: 4,770,427

[45] Date of Patent: Sep. 13, 1988

[54] AIRCRAFT LOADER AND METHOD OF ASSEMBLY

[75] Inventors: Howard E. Howell, Orlando; William C. Dean, Orange, both of Fla.

[73] Assignee: FMC Corporation, Chicago, Ill.

[21] Appl. No.: 856,617

[22] Filed: Apr. 25, 1986

[51] Int. Cl.$^4$ ............................ B60P 3/22; B60K 5/12
[52] U.S. Cl. .................................... 280/5 F; 137/576;
180/69.4; 180/298; 180/312; 414/495
[58] Field of Search ............... 180/11, 311, 312, 294,
180/298, 69.4; 280/5 R, 5 F; 414/495; 137/576

[56] References Cited

U.S. PATENT DOCUMENTS

| | | | |
|---|---|---|---|
| 1,900,773 | 3/1933 | Staniewicz | 180/294 |
| 3,418,003 | 12/1968 | Tate | 280/5 R |
| 3,710,885 | 1/1973 | Brown | 180/294 |
| 3,869,012 | 3/1975 | Schubach | 280/5 F X |
| 3,993,207 | 11/1976 | Jones | 414/495 |
| 4,304,518 | 12/1981 | Carder et al. | 414/495 |
| 4,325,451 | 4/1982 | Umeda | 180/294 |
| 4,342,406 | 8/1982 | Lee | 137/576 X |

Primary Examiner—John J. Love
Assistant Examiner—Charles R. Watts
Attorney, Agent, or Firm—Ronald C. Kamp; Richard B. Megley

[57] ABSTRACT

An aircraft loader having a mobile frame and hydraulically actuated components, includes a substantially rectangular frame hinged to and cantilevered from the mobile frame. The rectangular frame includes a pair of long tubes and a pair of short tubes which are sealingly connected to form a fuel tank. An internal combustion engine is mounted on the rectangular frame and drives a hydraulic pump which supplies hydraulic fluid under pressure to the components.

6 Claims, 2 Drawing Sheets

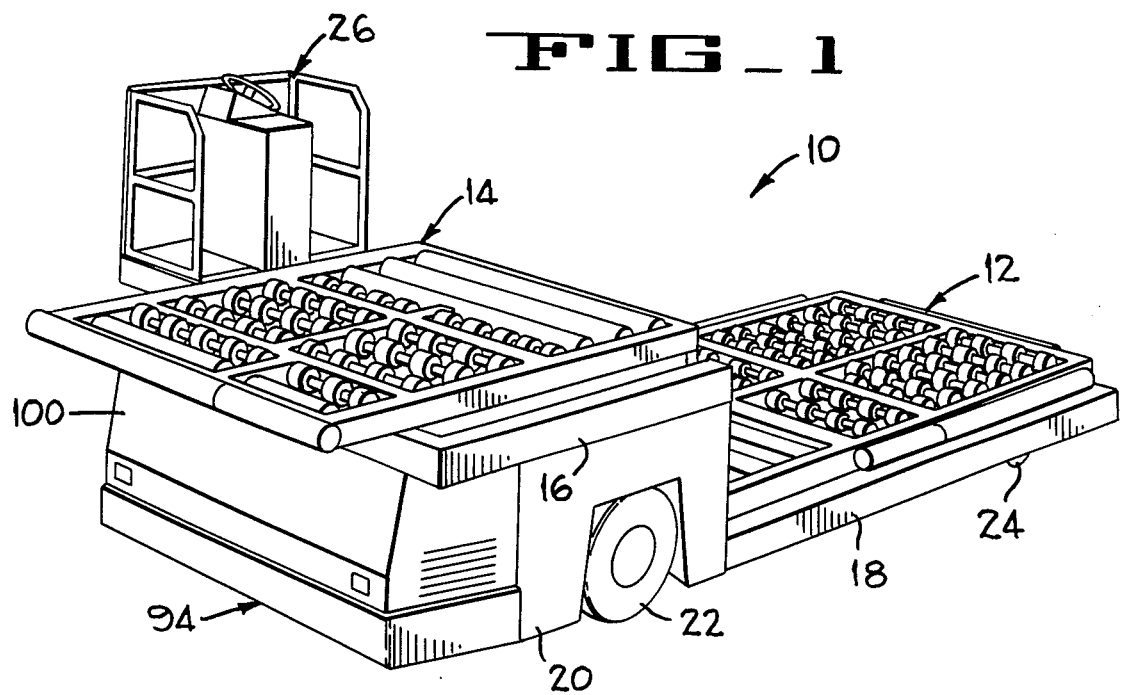
FIG_1
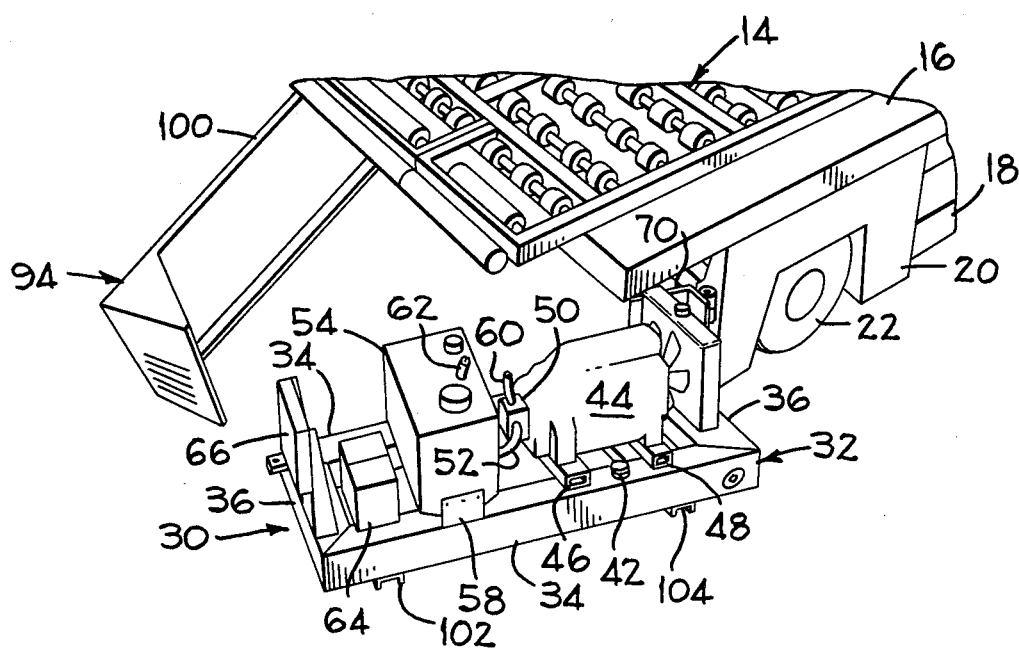
FIG_2

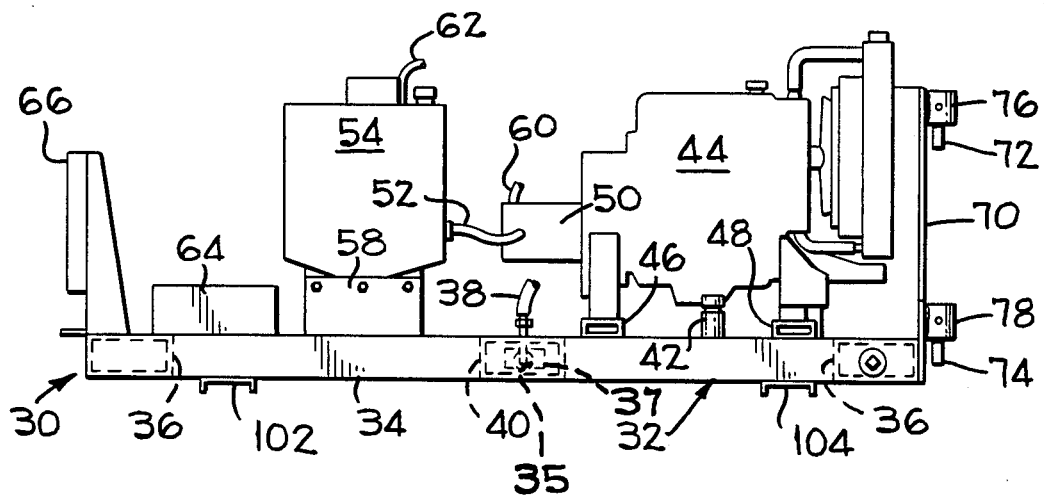
FIG_3
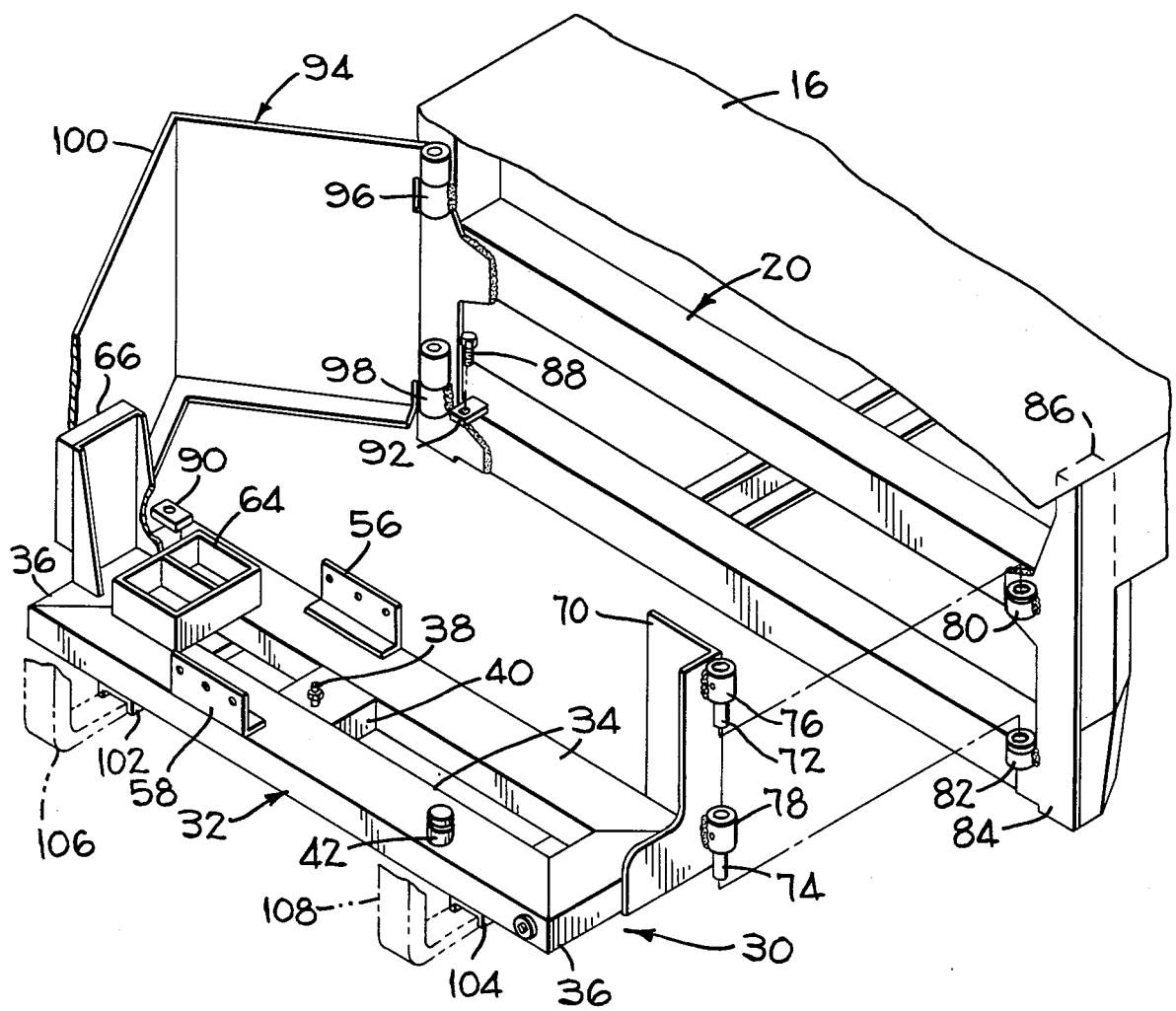
FIG_4

AIRCRAFT LOADER AND METHOD OF ASSEMBLY

This invention relates to aircraft loaders generally, and more particularly, to such loader having hydraulic and/or electric powered traction drive and assemblies.

Aircraft loaders move containers between the cargo bags of large aircraft and trailers or transporters having a working surface relatively close to the ground. The rear platform must, therefore, be supported from a frame section which is relatively close to the ground. The vertical movement required of the forward platform is determined by the variation in height of the cargo door sills on the different aircraft. Consequently, the frame section supporting the forward platform is typically elevated a considerable distance vertically above the frame section supporting the rear platform. The engine, hydraulic pump and reservoir, traction drive components, batteries, fuel tank, etc. must of necessity be positioned in the volume of space directly below the forward platform. Routine maintenance, repair and replacement of components within this space has been difficult and time consuming.

The present invention provides an aircraft loader which simplifies routine maintenance, which makes repair and/or replacement of defective components easier and less time consuming, which utilizes space and certain components efficiently, which permits an economical method of manufacture and which maximizes operating time.

These and other attributes of the present invention, and many of the attendant advantages thereof, will become more readily apparent from a perusal of the following description and the accompanying drawings, wherein:

FIG. 1 is a pictorial view of an aircraft loader incorporating the present invention;

FIG. 2 is a pictorial view of a portion of the loader shown in FIG. 1, showing the power module pivoted out from the loader;

FIG. 3 is a side elevational view of the power module shown in FIG. 2; and

FIG. 4 is a pictorial view of the front portion of the loader shown in FIG. 1, with portions broken away and eliminated, showing the bumper module pivoted open and a power module expanded from the loader.

Referring to FIG. 1, there is shown an aircraft loader, indicated generally at 10, having a rear platform 12 and a forward platform 14, each of which may have powered rollers for both transverse and longitudinal positioning and transport of containers thereon. The forward platform 14 is mounted on a hydraulically actuated scissors jack from an upper, forward frame section 16 and may be raised from the position shown to match the elevation of the sill of a cargo bay door on a large aircraft. The rear platform 12 is also supported from a lower, rear frame section 18 by a suitable hydraulically actuated jack system and may be selectively raised and lowered to match the elevation of container trailers and of the forward platform. The forward and rear frame sections 16 and 18 are interconnected through an intermediate frame section 20 to form a rigid frame which is supported by a pair of drive wheels, one of which is shown at 22, and a pair of unpowered rear wheels, one of which is partially shown at 24. An operator station, indicated generally at 26, is attached to and moves vertically with the forward platform 14. All of the power elements for driving the loader 10 and actuation of the rear platform 12 and the forward platform 14 are contained within the volume of space beneath the forward platform 14. The foregoing description is also applicable to conventional, aircraft loaders. The present invention however, makes more efficient use of that space and also allows a more efficient and economical method of manufacture, as will be explained hereinafter.

As shown in FIGS. 2-4, a power module, indicated generally at 30, is suspended for rotation about a vertical axis from one of the front corners of the intermediate frame section. The frame 32 of power module 30 is rectangular in plan form and is constructed of two long tubes 34 having a length a few inches less than the transverse width of the intermediate frame which are mitered and welded to two short tubes 36. These tubes are all hollow and the welds are continuous and oil tight so that it may function as a fuel tank as well as being the structural frame for the power module 30. Since the tank is shallow and long, the fuel is drawn from a fuel inlet tube 38 inserted in a hollow cross tube 40 connected between the long tubes 34 with communication between the cross tube 40 and the adjacent long tubes 34 restricted to only a small opening 35 positioned low and centrally of the cross tube 40. The effect of movement of the fuel resulting from acceleration of the loader is thereby minimized, and could be further minimized by installation of flapper valves 37 over the openings which will permit flow of fuel only into the cross tube 40. A capped filler tube 42 is provided on the outer one of the long tubes 34 to permit the introduction of fuel.

An engine 44 is mounted on engine mounts 46 and 48 secured to the top to the long tubes 34 of the power module frame 32. A hydraulic pump 50 is mounted on the engine 44 and is driven thereby. Hydraulic fluid is supplied to the intake of the pump 50 through intake conduit 52 connected to a hydraulic reservoir 54 which is attached to brackets 56 and 58 secured to the top of the frame 32. The output from the pump 50 is delivered through a flexible supply conduit 60, which is routed over the pivoted connection of the module frame 32 to the intermediate frame 20, to a conventional bank of valves mounted on the intermediate frame and operable from the operator station. Hydraulic fluid is returned to the reservoir 54 through flexible return conduit 62 routed in a manner similar to the supply conduit 60, as are any sensing lines needed for control of the pump output. Since all of the operations of the loader 10, including traction drive motors connected to drive the wheels 22, are hydraulically powered, the engine 60 can supply all of the power required by the loader 10 through the conduits interconnecting the power module 30 and the remainder of the loader 10. A battery box 64 is also mounted on the frame 32 for the storage batteries needed in the electrical system conventially powered by the engine 44. All of the electrical cables necessary for connection between the power module 30 and the basic loader 10 are also routed in a manner similar to the hydraulic conduits 60 and 62. An electrical control box 66 is mounted on the end of the module frame 32 opposite the engine 44.

The pivotally mounting of the power module 30 on the intermediate frame 20 is achieved by welding a heavy corner plate 70 on the corner of the module frame 32. A pair of vertically spaced and aligned pins 72 and 74 are held in and project downward from bosses 76 and 78 welded to the corner plate 70. The pins 72 and 74 are capable of insertion into a pair of vertically spaced and aligned bosses 80 and 82 welded to a reinforcing plate 84, which is welded to a vertical post 86 and a pair of cross members of the intermediate frame 20. Washer bushings, not shown, are preferrable inserted between mating bosses 76 and 80, and 78 and 82 to reduce the effort required to pivot the power module 30. Under normal operating conditions, the module is secured adjacent the intermediate frame by a bolt 88 which passes through a hole in a plate 90 secured to the frame 32 and engages a threaded hole in a plate 92 welded to the intermediate frame 20.

Since the power module frame 32 is also a fuel tank, protection from impact loads is desirable. A bumper module 94 is hinged to the intermediate frame by hinges 96 and 98, which are similar to the hinges mounting the power module 30 on the frame 20. The bumper module 94 preferably includes a cross member 100 which extends under the power module 30 to contact the intermediate frame directly so that impact loads are transmitted directly to the intermediate frame 20. Shrouding 100 may also be incorporated into or attached to the bumper module 94.

A pair of channel members 102 and 104 are secured to the lower surfaces of the long tubes 34 of the module frame 32. These channel members elevate the frame 32 above the floor to provide clearance for a fork lift and may be laterally spaced to accept the tines of a fork lift truck, as indicated at 106 and 108. With the bolt 88 removed, a fork lift truck may be used to raise and lower the power module off of and onto the bosses 80 and 82. Once installed, the power module may be easily and quickly removed simply by breaking the electrical and hydraulic connections and removing the bolt 88. The module is then pivoted out from under the overhang of the forward platform 14 and a folk lift used to lift the module off the bosses 80 and 82. A loader which would normally be removed from service for a major repair, such as rebuilding the engine, for example, may be returned to service by simply substituting another operable power module for the one needing repair.

The ability to easily install a power module makes possible an efficient method of manufacture. Purchasers of loaders will usually specify a particular engine. Forecasting the number of loaders becomes especially difficult because of the additional variable of the engine option. However, the basic loader, i.e., the entire loader but for the power module, may be built because this portion of the loader would be virtually the same for all purchasers. Power modules with different engine options installed are constructed separately. The power module having the specified engine option is then selected and installed on the basic loader. The customers order is, thereby, quickly and easily filled and without incurring the expense and time required when a completed loader has an engine option different from that ordered by the customer.

While a preferred embodiment of the present invention has been described and illustrated herein, various changes and modifications may be made therein without departing from the spirit of the invention as defined by the scope of the appended claims.

What is claimed is:

1. In an aircraft loader having a mobile frame and hydraulically actuated components, the improvement comprising:
    a substantially rectangular frame hinged to and cantilevered from said mobile frame;
    said rectangular frame including a pair of long tubes and a pair of short tubes sealingly connected to form a fuel tank;
    an internal combustion engine mounted on said rectangular frame; and
    a hydraulic pump driven by said engine to supply hydraulic fluid under pressure to said components.

2. The invention according to claim 1, and further comprising:
    a hollow central cross tube connected between said long tubes with limited access between said cross tube and said long tubes; and
    a fuel intake for said engine positioned in said cross tube whereby the effect of fuel movement is minimized.

3. The invention according to claim 2, and further comprising:
    check valve means for permitting flow of fuel only from said long tubes into said cross tube.

4. The invention according to claim 1, and further comprising:
    a pair of channel members secured to the underneath side of said rectangular frame and spaced apart to serve as supports for the rectangular frame when removed from said loader arm.

5. The invention according to claim 1, and furhter comprising:
    releasable lock means for securing said rectangular frame against pivoting relative to said mobile frame.

6. The invention according to claim 1, and further comprising:
    bumper means pivotally attached to said mobile frame on the side opposite the hinged mounting of said rectangular frame and capable of encircling said rectangular frame.

* * * * *